United States Patent [19]

Schmid

[11] Patent Number: 4,474,210

[45] Date of Patent: Oct. 2, 1984

[54] SURGE CONTROL WEIR STRUCTURE FOR SEWAGE TREATMENT PLANTS AND THE LIKE

[76] Inventor: Lawrence A. Schmid, 2804 Brad La., Manhattan, Kans. 66502

[21] Appl. No.: 572,131

[22] Filed: Jan. 19, 1984

Related U.S. Application Data

[63] Continuation of Ser. No. 340,003, Jan. 18, 1982.

[51] Int. Cl.$^3$ .............................................. E02B 7/26
[52] U.S. Cl. .................... 137/573; 137/574; 137/576; 405/104
[58] Field of Search ...................... 137/573, 574, 576; 405/104, 105

[56] References Cited

U.S. PATENT DOCUMENTS

| | | | |
|---|---|---|---|
| 592,721 | 10/1897 | Barnhart et al. | 137/574 |
| 648,312 | 4/1900 | Taylor | 405/104 |
| 1,120,351 | 12/1914 | Weston | 137/573 |
| 1,194,951 | 8/1916 | Burtis | 405/104 |
| 1,768,120 | 6/1930 | Crill | 405/104 |
| 2,311,862 | 2/1943 | Palmquist | 137/573 |
| 2,793,005 | 5/1957 | Wagner et al. | 137/574 |
| 3,287,918 | 11/1966 | Stewart | 405/104 |
| 3,335,571 | 8/1967 | Davis | 405/104 |

Primary Examiner—Alan Cohan
Assistant Examiner—John A. Rivell
Attorney, Agent, or Firm—Schmidt, Johnson, Hovey & Williams

[57] ABSTRACT

A simplified, energy efficient, low cost liquid flow controlling weir apparatus is provided for "in tank" flow equalization and surge control. The apparatus is especially adapted for use in waste water treatment plants at tank outlets, and includes first and second, opposed, spaced apart upright weirs; the inboard first weir adjacent tank water is of lesser height than that of the outboard weir, and the latter is provided with one or more apertures therethrough at a level below the upper margin of the first weir. When water within the tank rises past and overflows the inboard weir plate, liquid flow is controlled by the outboard weir plate openings, water is rapidly backed up in the tank as storage, and tank discharge is maintained at a relatively uniform rate until the tank storage capacity is reached. The outboard weir plate prevents tank overflow, and is advantageously set at a height for overflow at 125-135 percent of design flow through the system.

7 Claims, 9 Drawing Figures

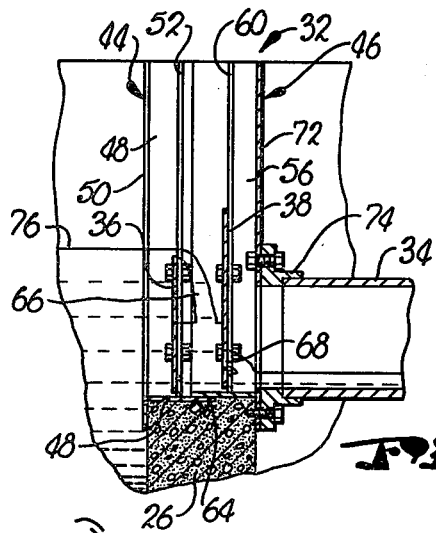 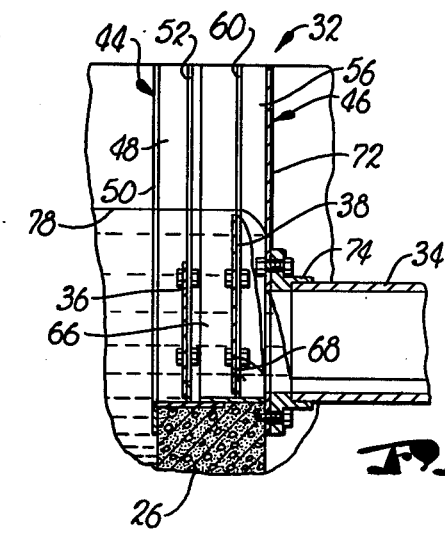 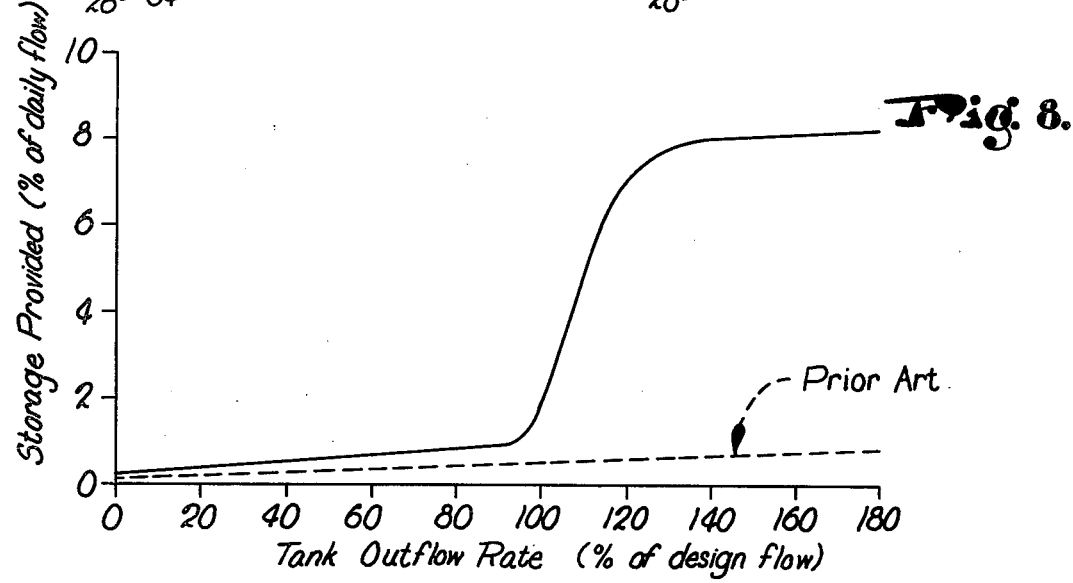 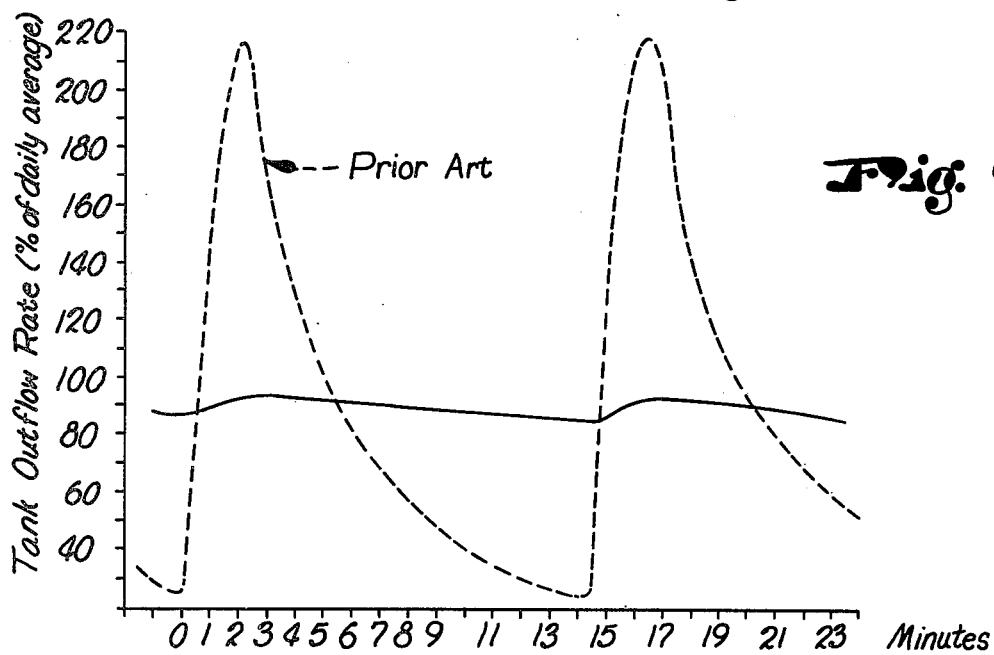

SURGE CONTROL WEIR STRUCTURE FOR SEWAGE TREATMENT PLANTS AND THE LIKE

This application is a continuation of application Ser. No. 06/340,003, filed 1/18/82.

BACKGROUND OF THE INVENTION

1. Field of the Invention

The present invention is broadly concerned with weir apparatus for low cost surge and flow control, particularly in relatively small waste water treatment plants. More particularly, it is concerned with such an apparatus which includes a lower, inboard weir plate along with a spaced, opposed weir plate of greater height and having one or more flow apertures therethrough at a level below the upper margin of the first weir plate. It has been found that a weir apparatus of this type gives excellent, "in tank" flow equalization without the need for auxiliary storage tanks and associated pumps and controls.

2. Description of the Prior Art

Typical waste water treatment plants employ a series of tanks or ponds for various operations such as aeration and sedimentation. Such systems also are designed to accommodate a given flow of water therethrough, based upon the perceived load requirements. However, past experience has shown that the only consistent characteristic of waste water flow is its inconsistency. That is to say, waste water treatment plants are very often subjected to rather extreme variations in both the strength and volume of waste water directed thereto, and this has resulted in many upsets and poor performance. As can be appreciated though, a waste water treatment plant has no control over when or in what volume it receives incoming feed. In addition, once waste water is directed to a treatment system, it is not conducive for long storage for further treatment. Solids within the waste water tend to settle out and anaerobic conditions will rapidly set in to create odor problems.

In an attempt to overcome these inherent problems, designers have sought to equalize the flow of waste water to treatment plants. This has generally involved use of equalization basins designed to hold surge quantities of waste water until they can be properly treated. Equalization basins may be designed as either in-line or side-line units. With in-line systems, all flow must pass through the equalization basin(s). This requires continual pumping at a near constant rate to the treatment processes. In side-line systems, the equalization basin(s) receive only that amount of waste water above the daily average. The overflow is then pumped back into the treatment process at a variable rate such that its addition to the general flow does not exceed the daily average.

While each of the above systems has its own advantages and disadvantages, both require additional storage basins and substantial mechanical equipment and energy inputs. While these considerations may not be controlling in the case of large treatment plants, they become critical in the case of small plants. As can be appreciated, the cost involved in providing auxiliary storage tanks and the like, along with the controls therefor, can be substantial in the case of a small waste water plant.

SUMMARY OF THE INVENTION

The present invention overcomes the problems noted above and provides a liquid flow controlling weir apparatus for positioning at the outlet of a liquid tank or the like, in order to achieve "in tank" flow equalization while eliminating the need for extra storage tanks and associated structure. Broadly speaking, the apparatus hereof includes a first upright weir plate adjacent liquid in the tank, and a second upright weir plate spaced from the first plate in a direction away from the tank liquid, with the second plate being of a height greater than that of the first plate and including structure defining at least one aperture therethrough at a level below the upper margin of the first plate.

In preferred forms, means are provided for vertically adjusting the second plate as desired to alter the vertical height thereof. Moreover, means are advantageously provided for defining opposed sidewalls extending between the first and second plates, whereby the sidewalls and the plates cooperatively define a liquid overflow chamber.

In use, the apparatus of the invention offers a number of benefits, including surge minimization to a level of about 125 percent of average flow rates (with the result that downstream tank sizings can be substantially reduced), minimization or elimination of extra storage tanks and associated equipment, and low initial and maintenance costs.

BRIEF DESCRIPTION OF THE DRAWINGS

FIG. 6 is a fragmentary view similar to that of FIG. 2, but illustrating a construction wherein a tubular, liquid conveying conduit is disposed adjacent the outboard face of the weir structure;

FIG. 7 is a view similar to that of FIG. 6, but illustrates the operation of the apparatus when the water level within the tank overflows the outboard weir plate;

FIG. 8 is a graphical representation summarizing the operation of the weir apparatus of the present invention in providing "in tank" storage, as compared with a prior art weir device; and FIG. 9 is a graphical representation illustrating the operation of the weir apparatus of the invention in the control of lift station surges, as compared with a prior art weir structure.

DESCRIPTION OF THE PREFERRED EMBODIMENTS

Figure 1:
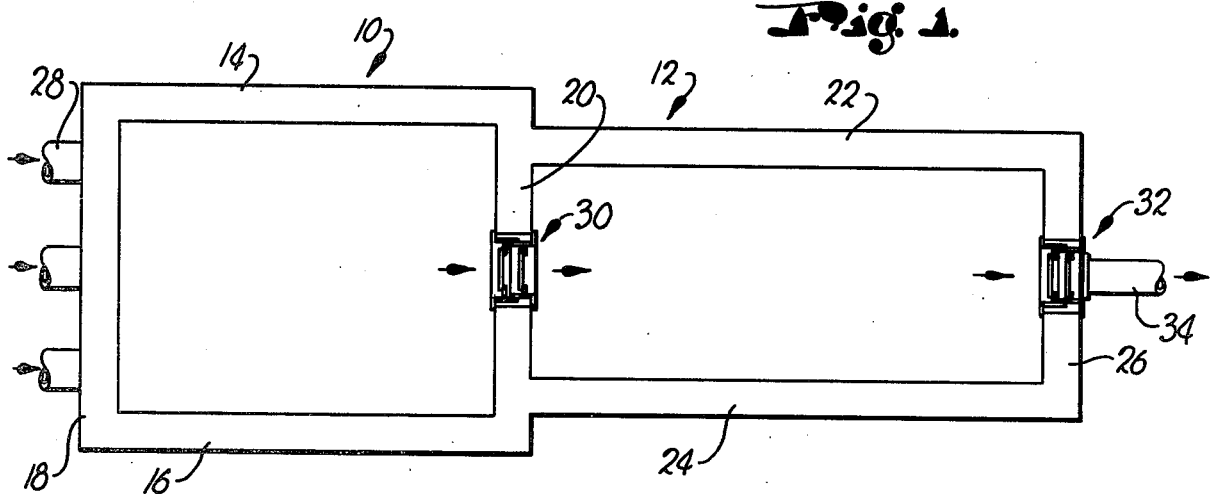
FIG. 1 is a plan view illustrating the aeration and clarifier tanks of a small waste water treatment facility, having the weir apparatus of the present invention located at the outlets of both of the depicted tanks.

Turning now to the drawings, and particularly FIG. 1, a pair of serially related tanks forming a part of a small waste water treatment plant are illustrated. In particular, an aeration tank 10 is depicted, along with a sedimentation or clarifier tank 12. The tank 10 includes upright sidewalls 14, 16, as well as end walls 18 and 20. The tank 12 includes sidewalls 22, 24 and end wall 26, and is joined to end wall 20 of tank 10 as illustrated. A plurality of inlet pipes 28 are provided for directing incoming waste water to the tank 10.

The tank arrangement illustrated in FIG. 1 is provided with a pair of weir devices 30, 32 in accordance with the invention. The device 30 is employed to regulate flow between the tanks 10, 12, whereas the device 32 is designed to control discharge of waste water through outlet conduit 34.

Turning now to FIGS. 2-5, it will be observed that the device 30 includes inboard, imperforate, rectangular weir plate 36, a spaced, opposed, apertured, second outboard weir plate 38, as well as frame structure broadly referred to by the numeral 40 for operatively supporting the plates 36, 38.

Figures 2, 3:
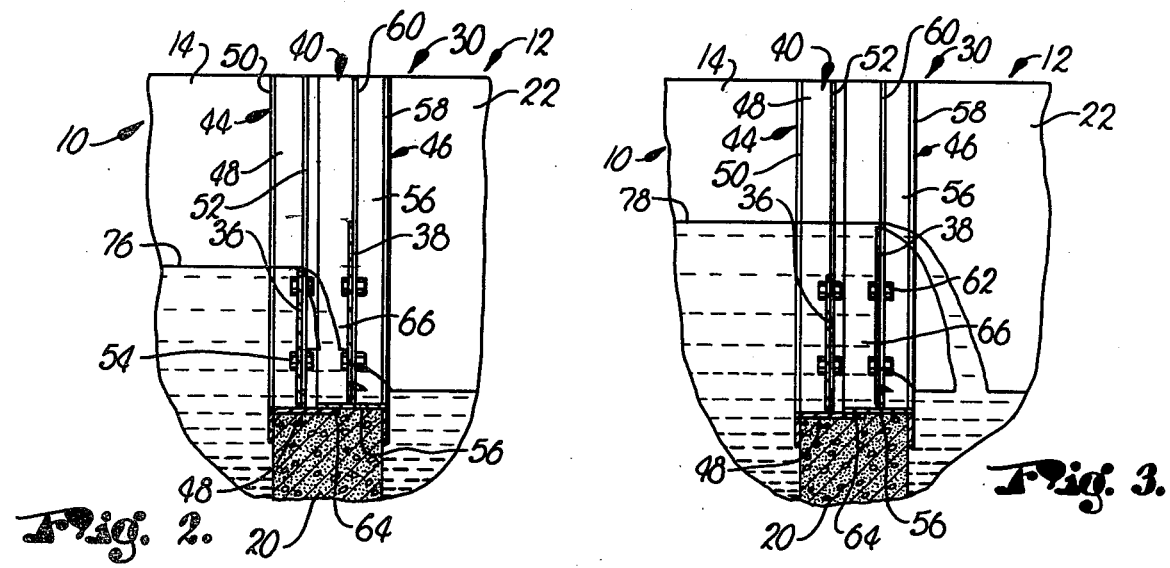
FIG. 2 is a fragmentary view in partial vertical section illustrating the flow control apparatus of the present invention, with water flow from a tank overflowing the inboard weir plate.
FIG. 3 is a view similar to that of FIG. 2, but illustrating the operation of the apparatus when the water level within the tank has risen above the level of the outboard weir plate.
Figures 4, 5:
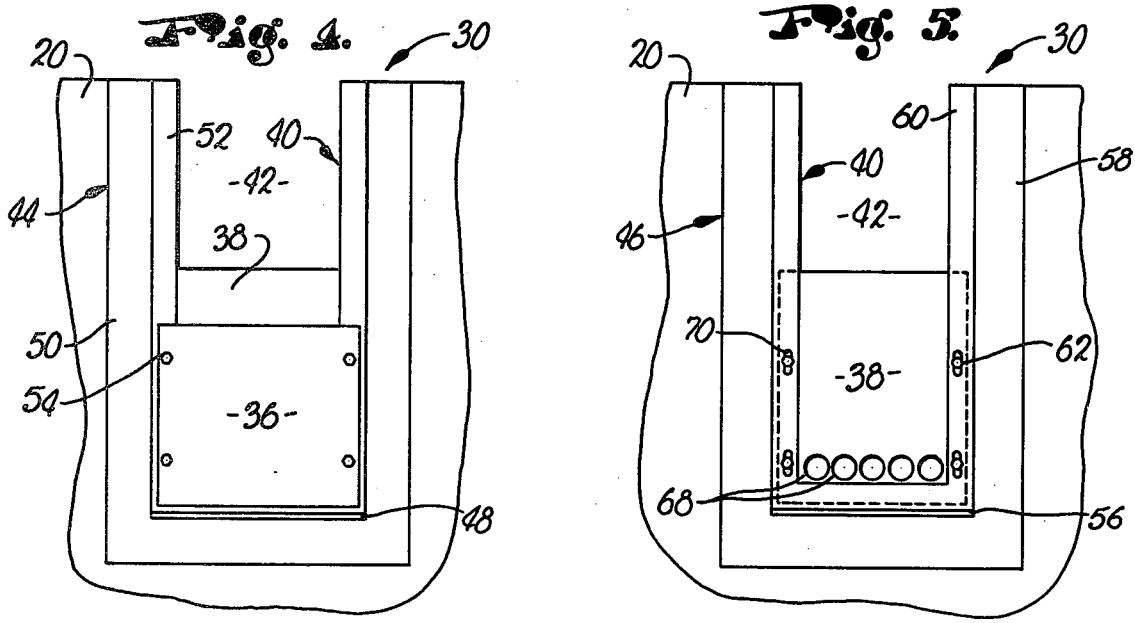
FIG. 4 is a fragmentary view depicting the inboard face of the weir apparatus of the invention.
FIG. 5 is a fragmentary view depicting the outboard face of the weir apparatus of the invention.

The frame structure 40 is designed to fit within an appropriate, rectangular outlet 42 fashioned within end wall 20. The frame structure 40 includes a pair of generally U-shaped spaced apart, opposed frame members 44, 46. The frame member 44 includes a continuous marginal flange 48 which extends along the bottom wall 20 and upwardly along the sidewalls of the opening 42. The frame 44 also includes a U-shaped marginal lip 50 which engages the inner surface of wall 20 as best seen in FIG. 2. Finally, the member 44 includes an inwardly extending, plate supporting rib 52 which is apertured to receive bolts 54 employed to secure the weir plate 36 thereto.

The frame member 46 is essentially identical with the member 44 and includes a similar marginal flange 56; a lip 58 in engagement with the outer surface of wall 20 remote from tank 10; and an apertured, inwardly extending rib 60 for supporting the outboard weir plate 38 by means of bolts 62. As best seen in FIGS. 2 and 3, the flanges 48, 50 project toward each other and overlap as at 64. Thus, the overlapped flanges in effect define opposed sidewalls and a bottom wall between the weir plates 36, 38; accordingly, the weir plates, along with the wall-defining overlapped flanges cooperatively present a liquid chamber 66 between the plates.

Weir plate 36 is, as shown, simply an imperforate metallic plate of rectangular configuration which is removably secured to the lip 52 of frame member 44. On the other hand, weir plate 38, although formed of metallic material and of generally rectangular configuration, differs in that it is taller than the inboard plate 36, and moreover is provided with a plurality of water flow apertures 68 therethrough. It will be observed in this regard that the flow apertures 68 are positioned below the upper margin of inboard weir plate 36, and the importance of this feature will be discussed hereinafter. Finally, the plate 38 is provided with oblong connection slots 70 for receiving the bolt 62; in this fashion, the plate 38 can be vertically adjusted as necessary to alter the effective height thereof.

The device 32 is in most respects identical with device 30, and for ease of discussion like parts have been identically numbered in both instances. Thus, the device 32 includes an inboard and an outboard weir plate 36, 38 respectively supported by frame members 44, 46 which cooperatively define along with the plates, a chamber 66. Moreover, the outboard weir plate 38 is taller than the inboard plate 36, and is provided with a plurality of water flow apertures 68 therethrough which are positioned below the upper margin of the inboard plate.

The device 32 is designed, however, to discharge into tubular conduit 34. For this purpose, an outer, apertured plate 72 is affixed to the outer surface of wall 26 in blocking disposition to the flow of water out of tank 12, and the conduit 34 is secured, by means of an annular coupler 74, to the plate 72.

The operation of device 30 can best be understood from a study of FIGS. 2-3. That is to say, during low flows the water level in chamber 66 is lower than the water level 76 and the flow from tank 10 to tank 12 is controlled by the inboard weir, with the water level 76 being just slightly above the inboard weir (see FIG. 2). During normal flow of waste water through the tanks 10, 12, the water level 76 and in chamber 66 is above the upper margin of inboard weir plate 36. Under this operational condition, flow control is provided by means of the apertures 68. Inasmuch as these apertures have a significant head on them when they begin to operate, discharge from tank 10 into tank 12 is relatively uniform. Thus, during normal surging of waste water through the tank system, the flow control apertures 68 serve to maintain a relatively uniform discharge into tank 12, and as a consequence the surge waste water is stored within tank 10.

In the event of surging within the system well beyond the design capacity thereof, the outboard weir 38 serves to prevent overflowing of the tank 10. Thus, it will be seen (see FIG. 3) that the upper margin of the weir 38 is well below the top of the tank walls so that as the level 78 of waste water rises it will overflow into tank 12 before it reaches the top of the tank 10.

Thus, it will be seen that the apparatus hereof essentially provides three weir controls for handling and at least partially equalizing low, normal and high flows through the system.

The operation of the device 32 (see FIGS. 6-7) is essentially identical with that described in connection with device 30, save for the fact that the discharge from the apparatus 32 is directed to the conduit 34, as opposed to another tank.

FIG. 8 is a graphical representation illustrating the operation of the apparatus hereof, as opposed to a prior weir device. The graph depicts the operation of a weir apparatus employing three 0.8 inch orifices located eight inches below a one foot wide rectangular inboard weir, with the outboard weir having a height six inches greater than the inboard weir. The 100 percent design flow used in this example is 30,000 gallons per day. The full line graph demonstrates that the plant will pass essentially all flows that come to it below 100 percent of design flow, and moreover store sustained flows above this level until the discharge exceeds 125 percent of the design flow. Beyond this point essentially no additional storage occurs, in that water flow is passing over the outboard, uppermost weir. The dotted line representation of FIG. 8 depicts the storage capability of a typical effluent weir used in the prior art, which consists of a V-notched weir plate with 90 degree V-notches about two inches deep and six inches apart. As can be seen, the storage capability with such a weir arrangement is negligible, and whatever passes into the tank must pass out at essentially the same rate.

FIG. 9 is a graphical representation wherein surface overflow rate based upon percentage of daily average is plotted against time, for the weir apparatus of the invention (solid line graph) and the described prior art effluent weir (dotted line). In the prior art design, surge flows reached a level of approximately 220 percent of the daily average, and this level of surge flow could cause clarifier tank upset and inefficient treatment. On the other hand, use of the apparatus of the invention limited peak overflow rates to 125 percent of design flow, and flow changes were much more gradual.

It will therefore be seen that the "in tank" orifice-controlled weir apparatus of the invention provides a simplified, energy efficient, low cost way to improve the operational characteristics of waste water treatment processes. The apparatus hereof gives all of the advantage of "side line" systems while eliminating the need for extra storage tanks and pumping facilities. In addition, with the invention, surges from diurnal peaks are held at less than 125 percent of average flows, reducing the necessary size of downstream tanks by a significant amount. Moreover, auxiliary aeration costs are eliminated, raw sewage storage odor problems are minimized, and installation and maintenance costs and time are negligible. Thus, flow equalization can be effectively achieved in the smallest of plants.

While the weir device of the invention has been shown in conjunction with a tank or basin outlet, use thereof is not so limited. For example, a flow pipe arrangement similar to that of FIGS. 6–7 could be provided adjacent the inboard weir member.

I claim:

1. Liquid flow controlling apparatus for positioning proximal to a liquid outlet or the like, said apparatus comprising:

a first upright weir plate adjacent said outlet;

a second upright weir plate spaced from said first plate in a direction away from said outlet, said second plate being of a height greater than said first plate, there being a vertical region above said first plate and bounded at its lower and upper ends by the upper margins of said first and second plates respectively, said region presenting a first open area;

liquid flow and level-controlling means for liquid storage and discharge including structure defining liquid flow-controlling aperture means through said second plate and below the upper margin of the first plate, said aperture means being dimensioned to present a second open area which is less than said first open area above said first plate for controlling liquid flow through said apparatus.

2. Apparatus as set forth in claim 1, including means for vertically adjusting said second plate to change the vertical height thereof.

3. Apparatus as set forth in claim 1, including means defining opposed sidewalls extending between said first and second plates, whereby said sidewalls and first and second plates cooperatively define a liquid chamber.

4. Apparatus as set forth in claim 3, said sidewall-defining means comprising a frame member for each plate respectively, each of said frames having a projecting side marginal flange, said frame flanges overlying one another between said plates.

5. Apparatus as set forth in claim 1, including tubular liquid conveying means proximal to said aperture and located adjacent the face of said second plate remote from said first plate.

6. Apparatus as set forth in claim 1, there being a plurality of said apertures through said second plate.

7. Apparatus as set forth in claim 1, said liquid outlet comprising an opening in a liquid tank wall, said apparatus being positioned substantially within said tank wall opening.

* * * * *